United States Patent [19]

Hardwick et al.

[11] 4,105,130
[45] Aug. 8, 1978

[54] RECEPTACLE TRANSPORTING VEHICLE

[76] Inventors: Thomas Lee Richard Hardwick; Thomas James Hardwick, both of 1212 S. Parker, Olathe, Kans. 66061

[21] Appl. No.: 768,410

[22] Filed: Feb. 14, 1977

[51] Int. Cl.² .............................................. B65G 7/00
[52] U.S. Cl. .................................... 214/314; 214/308
[58] Field of Search ............... 214/302, 313, 314, 315, 214/390, 704, 505, 308

[56] References Cited

U.S. PATENT DOCUMENTS

| | | | |
|---|---|---|---|
| 2,478,462 | 8/1949 | Decker | 214/704 |
| 2,963,185 | 12/1960 | Jones et al. | 214/505 |
| 3,330,429 | 7/1967 | Kress | 214/390 |
| 3,702,662 | 11/1972 | Davieau | 214/302 |
| 3,825,135 | 7/1974 | Kress | 214/313 |
| 3,902,616 | 9/1975 | Santic et al. | 214/313 |
| 4,036,383 | 7/1977 | Allen | 214/313 |

*Primary Examiner*—Lawrence J. Oresky
*Attorney, Agent, or Firm*—Fishburn, Gold & Litman

[57] ABSTRACT

A receptacle transporting vehicle adapted to carry an open-top receptacle, such as a slag pot, includes an upper or scull frame adapted to retain and support the receptacle thereon and a dumping frame positioned between the scull frame and a mobile main frame. The scull frame and the dumping frame are each pivotally mounted on the main frame and respective extensible members effect movement of the scull frame and the dumping frame and thereby movement of the receptacle to a position for discharging the contents thereof. The scull frame has hook portions and movable keeper members engageable with respective trunnion portions of the receptacle for retaining the receptacle in supported engagement during transportation and the discharging of the contents thereof.

10 Claims, 3 Drawing Figures

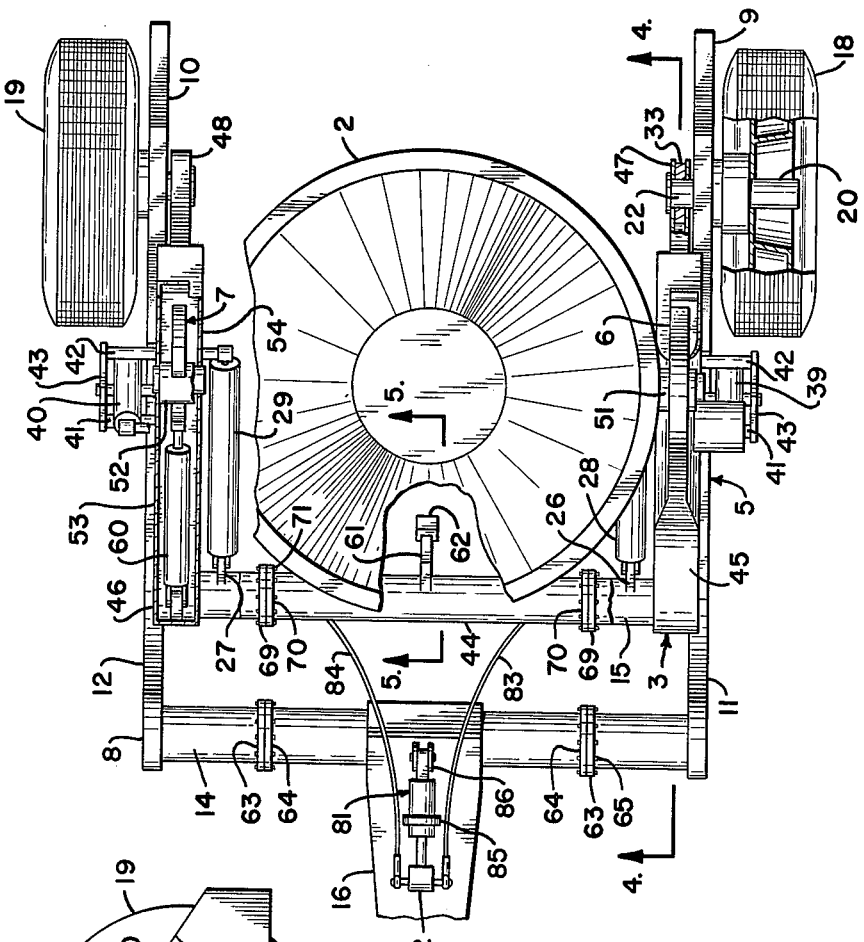

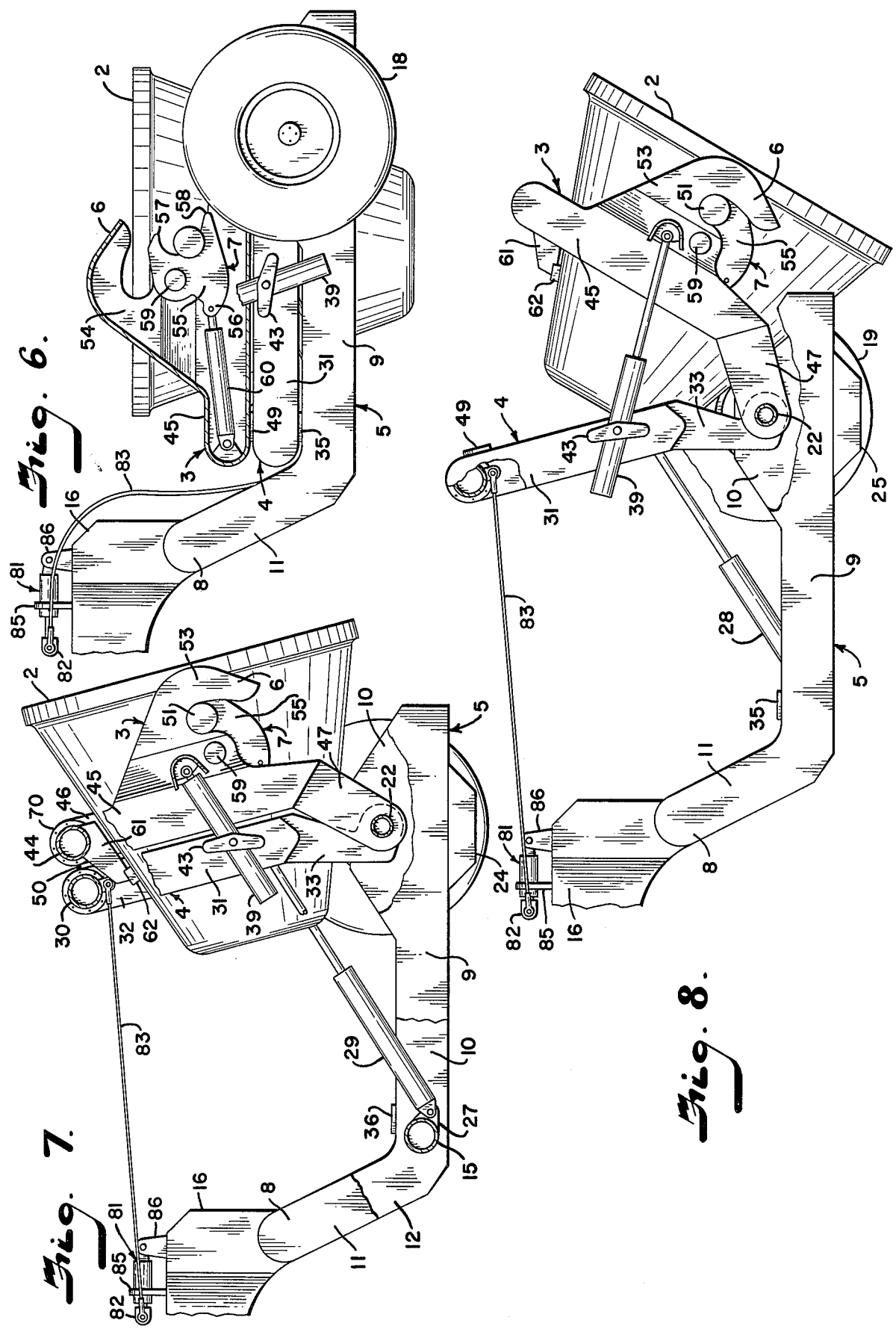

RECEPTACLE TRANSPORTING VEHICLE

The present invention relates to receptacle carrying vehicles and more particularly to a receptacle transporting vehicle adapted to carry very heavy loads and discharge contents of a receptacle while retaining the receptacle in supported engagement.

The principal objects of the present invention are: to provide a receptacle transporting vehicle having an upper or scull frame movable through an angle of approximately 120° during discharging contents of the receptacle; to provide such a receptacle transporting vehicle having hook portions and keeper members engageable with respective trunnion portions of the receptacle for retaining same in supported engagement during discharging the contents of the receptacle; to provide such a receptacle transporting vehicle having an abutment member on the upper or scull frame which is engageable with the receptacle during moving the receptacle toward the position for discharging the contents thereof to maintain the receptacle in a tilted position during the movement; to provide such a receptacle transporting vehicle adapted to discharge contents of a receptacle while retaining an upper portion of the receptacle in supported engagement; to provide such a receptacle transporting vehicle which is stable in use and has a minimum width; to provide such a receptacle transporting vehicle which is capable of moving a rim of the receptacle rapidly into and out of engagement with a ground or other surface to remove sculls or caked material from the receptacle; and to provide such a receptacle transporting vehicle which is durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the receptacle transporting vehicle.

FIG. 3 is a top plan view of the receptacle transporting vehicle with portions broken away to better illustrate component parts thereof.

FIG. 4 is a fragmentary longitudinal sectional view taken on line 4—4 of FIG. 3 and showing means for retaining the trunnion portions of the receptacle in supported engagement during discharging contents of the receptacle.

FIG. 5 is a fragmentary longitudinal sectional view taken on line 5—5 of FIg. 3 and showing an abutment member for positioning the receptacle in a tilted position during movement thereof to a dumping position.

FIG. 6 is a fragmentary side elevational view with portions broken away to show frames of the vehicle in position for receiving the receptacle.

FIG. 7 is a fragmentary side elevational view showing frames of the vehicle in an intermediate position during movement of the receptacle to position for discharging the contents of the receptacle.

FIG. 8 is a fragmentary side elevational view showing components in position for discharging the contents of the receptacle.

Figures 1, 2:
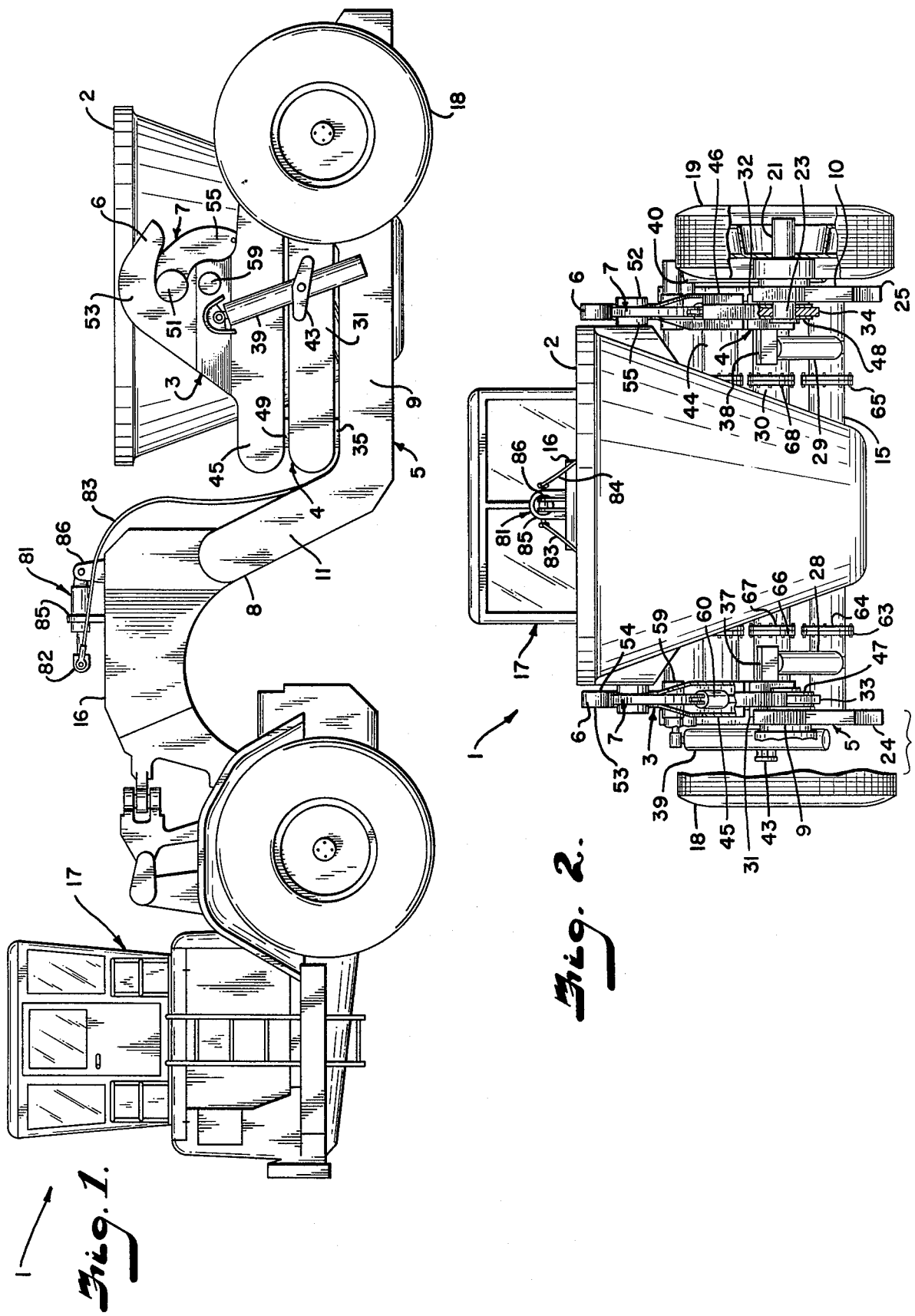
FIG. 1 is a side elevational view of a receptacle transporting vehicle embodying features of the present invention and showing components thereof in receptacle carrying or transporting position.
FIG. 2 is a rear elevational view of the receptacle transporting vehicle with portions broken away to better illustrate component parts thereof.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a receptacle transporting vehicle adapted to carry an open-top receptacle 2, such as a slag pot or the like and to move the receptacle 2 to a position for discharging contents thereof. The vehicle 1 is also capable of moving a rim of the receptacle 2 into and out of engagement with a ground surface to remove sculls or caked material from the receptacle 2. The receptacle transporting vehicle is particularly for heavy loads as slag pots and contents may weigh 400,000 to 500,000 pounds and the contents may be semi-molten. Therefore, the vehicle not only carries the heavy load, it moves over pavement, or other surfaces to a dumping area with a minimum of disturbance of the contents of the pot.

The receptacle transporting vehicle 1 includes an upper or scull frame 3 adapted to retain and support the receptacle 2 thereon and a dumping frame 4 positioned between the scull frame 3 and a mobile main or carrier frame 5. The scull frame 3 and the dumping frame 4 are each pivotally mounted on the main frame 5 and respective extensible members effect movement of the scull frame 3 and the dumping frame 4 and thereby movement of the receptacle 2 to a position for discharging the contents thereof. The scull frame 3 has hook portions 6 and movable keeper members 7 each engageable with respective trunnion portions of the receptacle 2 for retaining the receptacle 2 in supported engagement during transportation and the discharging of the contents thereof.

The illustrated main or carrier frame 5 is a generally U-shaped structure including a forward end portion 8 and a pair of side members or arms 9 and 10 extending rearwardly from the forward end portion 8 and spaced transversely outwardly from a longitudinal central axis of the main frame 5 and the receptacle transporting vehicle 1.

The forward end portion 8 includes upwardly and forwardly extending end portions 11 and 12 of the side arms 9 and 10 respectively. Upper and lower transversely extending frame members 14 and 15 extend between the end portions 11 and 12 and define the forward end portion 8 of the main frame 5.

The forward end portion 8 of the main frame 5 has connection means 16 thereon for connecting the main frame 5 to a prime mover 17 and for permitting relative movement therebetween. The connecting means 16 may be any suitable structure adapted to transfer a pulling or pushing force from the prime mover 17 to the vehicle 1 and permitting relative movement therebetween.

The forward end portion 8 and the side members 9 and 10 of the main frame 5 are hollow beams formed of suitable structural elements, such as plates, angles, tubes, and the like, which are effective to support substantial loads, such as in the range of 400,000 lbs. to 500,000 lbs. while moving.

The main frame 5 is a mobile structure and has one or more surface engaging wheels 18 and 19 mounted on the side arms or members 9 and 10 respectively. In the illustrated embodiment, the bottoms of the side arms 9 and 10 are linear and the rear end portions of the side arms 9 and 10 are of greater heights vertically than intermediate portions and have axle portions 20 and 21 respectively mounted thereon and extending laterally outwardly therefrom. The axle portions 20 and 21 have the wheels 18 and 19 respectively mounted thereon.

Pins or bearing members 22 and 23 are mounted on the side arms 9 and 10 in substantial alignment with the axle portions 20 and 21 and extend laterally inwardly therefrom. The pins or bearing members 22 and 23 provide pivotal support for the dumping frame 4 and the scull frame 3. The bearing members 22 and 23 are illustrated as hollow shafts extending from the main frame side members 9 and 10 respectively.

The main frame 5 has means thereon effective to prevent excessive drop of the receptacle 2 in the event of a tire blow-out on one of the wheels 18 and 19. In the illustrated embodiment, the arms 9 and 10 have support members 24 and 25 respectively mounted thereon and depending therefrom. The support members 24 and 25 are engageable with a support or ground surface and are positioned adjacent and below the axle portions 20 and 21 respectively.

The lower transverse frame member 15 of the main frame 5 has rearwardly extending brackets 26 and 27 for pivotally supporting one end of respective extensible members 28 and 29 connected to the dumping frame 4.

The dumping frame 4 is also a generally U-shaped structure including a forward end portion 30 and a pair of side members or arms 31 and 32 extending rearwardly from the forward end portion 30 and spaced transversely outwardly from the longitudinal central axis of the dumping frame 4. The side members 31 and 32 of the dumping frame 4 have rear end portions 33 and 34 respectively pivotally mounted on the pins or bearing members 22 and 23 on the rear end portions of the side members 9 and 10 respectively of the main frame 5.

In the illustrated embodiment, the forward end portion 30 of the dumping frame 4 is positioned above and aligned with the lower transverse frame member 15 of the main frame 5 when the dumping frame 4 is in position for carrying the receptacle 2 and the contents thereof. The side members 31 and 32 of the dumping frame 4 have the rear end portions 33 and 34 respectively thereof extending downwardly and rearwardly from major portions of the side members 31 and 32 of the dumping frame 4 and the rear end portions 33 and 34 are positioned inwardly of and between the arms 9 and 10 respectively of the main frame 5.

The major portions of the side arms 31 and 32 of the dumping frame 4 are above and in engagement with the side arms 9 and 10 of the main frame 5 when the dumping frame 4 is in a position for carrying the receptacle 2 and the contents thereof. In the illustrated embodiment, the side arms 9 and 10 of the main frame 5 have bearing plates 35 and 36 respectively thereon and engageable by lower surfaces of the side arms 31 and 32 respectively of the dumping frame 4.

The forward end portion 30 and the side arms 31 and 32 of the dumping frame 4 are also hollow beams formed of suitable structural elements, such as plates, angles, tubes, and the like, which are effective to support substantial loads including the scull frame 3, the receptacle 2, and the contents thereof.

Inwardly facing surfaces of the side arms 31 and 32 of the dumping frame 4 have brackets 37 and 38 respectively thereon which pivotally support the other end of the extensible members 28 and 29 respectively.

The extensible members 28 and 29 thereby extend between the forward end portion 8 of the main frame 5 and the side members 31 and 32 of the dumping frame 4 and are effective to raise and lower the dumping frame 4 relative to the main frame 5. The illustrated extensible members 28 and 29 are two-stage cylinders and one of the stages is preferably double acting. The extensible members 28 and 29 are capable of moving the dumping frame 4, scull frame 3, and the receptacle 2 with contents therein through an arc of at least 75°.

The side arms 31 and 32 of the dumping frame 4 have extensible members 39 and 40 respectively pivotally mounted thereon and operative to move the scull frame 3 relative to the dumping frame 4 and between a first position for carrying the receptacle 2 and contents therein and a second position for discharging contents of the receptacle 2. In the illustrated embodiment, each of the dumping frame side arms 31 and 32 has a pair of longitudinally spaced brackets 41 and 42 extending outwardly from the exterior surface thereof. A mounting member 43 is positioned substantially parallel with the exterior surface of each of the arms 31 and 32 of the dumping frame 4. The mounting members 43 each extend between and have opposite ends thereof mounted on the brackets 41 and 42.

An intermediate portion of each of the extensible members 39 and 40 is pivotally mounted on the respective mounting member 43 and on the exterior surface of the dumping frame side members 31 and 32 respectively, as by suitable pivot pins extending from the mounting members 43 and from the dumping frame side members 31 and 32.

The extensible members 39 and 40 are operative to move the scull frame 3 relative to the dumping frame 4 after the extensible members 28 and 29 have moved the dumping frame 4 from the carrying position. The extensible members 39 and 40 are operative to move the scull frame 3 through an arc of approximately 45° so that the total movement of the scull frame 3 is through an arc of approximately 120°.

The scull or receptacle supporting frame 3 is also a generally U-shaped structure including a forward end portion 44 and a pair of side arms or members 45 and 46 extending rearwardly from the forward end portion 44 and spaced transversely outwardly from a longitudinal central axis of the scull frame 3. The side members 45 and 46 of the scull frame 3 have rear end portions 47 and 48 respectively pivotally mounted on the pins or bearing members 22 and 23 on the rear end portions of the side members 9 and 10 respectively of the main frame 5.

In the illustrated embodiment, the forward end portion 44 of the scull frame 3 is positioned above and aligned with the forward end portion 30 of the dumping frame 4 and with the lower transverse member 15 of the main frame 5 when the scull frame 3 and the dumping frame 4 are in position for carrying the receptacle 2 and the contents thereof. The side members 45 and 46 of the scull frame 3 have the rear end portions 47 and 48 respectively thereof extending downwardly and rearwardly from major portions of the side members 45 and 46 of the scull frame 3. The rear end portions 47 and 48 of the scull frame side arms 45 and 46 are bifurcated to be mounted on the pins or bearing members 22 and 23 and with the rear end portion 33 and 34 of the dumping frame side members 31 and 32 respectively positioned therebetween.

The major portions of the scull frame side arms 45 and 46 are above and in engagement with the respective major portions of the dumping frame side arms 31 and 32 when the scull frame 3 is in position carrying the receptacle 2 and the contents thereof. In the illustrated embodiment, the side arms 31 and 32 of the dumping frame 4 have bearing plates 49 and 50 respectively thereon and are engageable by lower surfaces of the side arms 45 and 46 respectively of the scull frame 3.

The forward end portion 44 and the side members 45 and 46 of the scull frame 3 are also hollow beams formed of suitable structural elements, such as plates, angles, tubes, and the like, which are effective to support substantial loads including the receptacle 2 and the contents therein.

The receptacle transporting vehicle 1 includes means on the scull frame 3 for engaging trunnion portions 51 and 52 of the receptacle 2 and for retaining the receptacle 2 in supported engagement during discharging contents of the receptacle 2. In the illustrated embodiment, each of the side members 45 and 46 of the scull frame 3 has socket defining means in the form of a hook portion 6 thereon and positioned intermediate the ends of the scull frame side arms 45 and 46. The sockets or hook portions 6 are each rearwardly open and each are formed of laterally spaced plates 53 and 54, for a purpose later described.

The receptacle retaining means includes trunnion engaging and moving means in the form of a keeper portion or member 7 for each of the hook portions 6 and the respective keeper member 7 is pivotally mounted thereon. Each keeper member 7 is movable between a first position closing the respective rearwardly open socket or hook portion 6 and a second position opening the respectively rearwardly open hook portion 6. The keeper members 7 are each positioned between the laterally spaced plates 53 and 54 of the respective hook portion 6.

Each of the keeper members 7 includes a body portion 55 and a first ear 56 extending from the body portion 55. Second and third circumferentially spaced ears 57 and 58 also extend from the body portion 55. The second and third ears 57 and 58 are spaced and shaped to surround a substantial portion of the respective receptacle trunnion portions 51 and 52.

In the illustrated embodiment, the body portion 55 of each of the keeper members 7 is mounted on a pin 59 mounted on the respective hook portion 6 and extending between the laterally spaced plates 53 and 54 thereof. The pins 59 each extend through the body portion 55 of the respective keeper members 7 thereby defining the pivotal mounting of the keeper members 7 on the respective hook portions 6.

The scull frame side arms 45 and 46 each have an extensible member 60 positioned between the laterally spaced plates 53 and 54 of the respective side member. The extensible members 60 each have one end thereof pivotally connected to the first ear 56 of the respective keeper member 7 and each are operative to move the respective keeper member 7 between the first and second positions.

The hook portions 6 are formed so that an acute angle in the range of 2° to 8° is defined between a vertical line through the center of a respective one of the pins 59 and a line extending through the center of the respective pin and through the center a respective one of the trunnion portions 51 and 52 of the receptacle 2 when same is seated or retained within the respective hook portions 6. The lines through the center of each of the pins 59 and through the respective trunnion portions 51 and 52 each extend upwardly and forwardly from the center of the respective pins 59 defining the pivotal mounting of the keeper member 7.

The extensible members 39 and 40 each have one end thereof pivotally mounted on the exterior of the hook portion 6 on the respective scull frame side arms 45 and 46. The one end of each of the extensible members 39 and 40 is positioned forwardly of the respective pins 59 and the extensible members 39 and 40 are inclined upwardly and forwardly from the pivotal mounting thereof on the dumping frame side arms 31 and 32 whereby a minimum stroke of the extensible members 39 and 40 is required to move the scull frame 3 relative to the dumping frame 4.

The scull frame 3 has means thereon engageable by the receptacle 2 to limit swinging movement of the receptacle 2 when the receptacle 2 and the scull frame 3 are being moved toward the second position for discharging contents of the receptacle 2. In the illustrated embodiment, an elongated abutment member or rib 61 is mounted on the forward end portion 44 of the scull frame 3 and positioned on the longitudinal central axis of the scull frame 3. The rib 61 has a rearward edge inclined upwardly and forwardly from a lower edge of the rib 61 and the rearward edge of the rib 61 is substantially parallel with an adjacent surface of the receptacle 2. The lower edge of the rib 61 may have a pad 62 mounted thereon and engageable with a side of the receptacle 2.

It is desirable that the receptacle transporting vehicle 1 be separable into component parts for transportation. The forward end portion of each of the frames is separable from the side arms thereof so that the parts may be stored in substantially less space than the assembled vehicle.

The illustrated forward end portion 8 of the main frame 5 includes opposite end portions connected to the side arms 9 and 10 respectively and a center portion connected to the opposite end portions. The upper and lower frame members 14 and 15 of the main frame forward end portion 8 have sets of connection flanges 63 and 64 on the opposite end portions and the center portion thereof. Each of the sets of connection flanges 63 and 64 are removably secured together by suitable fastening devices, such as bolts 65.

The illustrated forward end portion 30 of the dumping frame 4 includes opposite end portions connected to the side arms 31 and 32 respectively and a center portion connected to the opposite end portions. The dumping frame forward end portion 30 has two sets of connection flanges 66 and 67 on the opposite end portions and the center portion thereof. Each of the sets of connection flanges 66 and 67 are removably secured together by suitable fastening devices, such as bolts 68.

The illustrated forward end portion 44 of the scull frame 3 includes opposite end portions connected to the side arms 45 and 46 respectively and a center portion connected to the opposite end portions. The scull frame forward end portion 44 has two sets of connection flanges 69 and 70 on the opposite end portions and the center portion thereof. Each of the sets of connection flanges 69 and 70 are removably secured together by suitable fastening devices, such as bolts 71.

When the center portion of the scull frame forward end portion 44 has been removed, the extensible member 60 within each of the scull frame side arms 45 and 46 may be installed or removed from the respective scull frame side arms 45 and 46. The extensible members 28 and 29 extending between the main frame forward end portion 8 and the dumping frame side arms 31 and 32 may also be removed for transportation. The extensible members 39 and 40 mounted on the dumping frame side arms 31 and 32 may also be removed for transportation.

When it is desired to discharge the contents of the receptacle 2, the receptacle transporting vehicle 1 is positioned in the desired location and the extensible members 28 and 29 extending between the main frame 5 and the dumping frame 4 are operated to raise the dumping frame 4, scull frame 3, receptacle 2, and contents therein. As the scull frame 3 is raised, the receptacle 2 attempts to remain vertical, however, the forward side thereof engages the rear edge of the rib 61 and the pad 62 thereon positioned on the longitudinal central axis of the scull frame 3 and the receptacle 2 is thereby retained in a tilted position. The extensible members 28 and 29 extending between the main frame 5 and the dumping frame 4 move the dumping frame 4 through an arc of approximately 75° and the extensible members 39 and 40 mounted on the dumping frame 4 then move the scull frame 3 and the receptacle 2 thereon through an angle of approximately 45° so that the total angular movement of the scull frame 3 is through an arc of approximately 120°. After the contents of the receptacle 2 have been discharged, the rim of the receptacle 2 may be repeatedly moved into and out of engagement with a ground or support surface to jar or vibrate sculls or caked material from the interior of the receptacle 2. The extensible members 39 and 40 mounted on the dumping frame 4 are extended and retracted in rapid movements. After the contents of the receptacle 2 have been discharged and the sculls have been removed, the extensible members 39 and 40 mounted on the dumping frame 4 are retracted to move or return the scull frame 3 into engagement with the dumping frame 4. The extensible members 28 and 29 extending between the main frame 5 and the dumping frame 4 are then retracted. After the double acting stage of each of the extensible members 28 and 29 has been retracted, the other stage of the extensible members is retracted by the weight of the frames 3 and 4 and the empty receptacle 2.

When the center of the receptacle 2 moves rearwardly of or beyond a vertical line extending through the center of the pins 22 and 23 pivotally mounting the dumping frame 4 and the scull frame 3 on the main frame 5, the weight in the receptacle 2 tends to pull the dumping frame 4 and scull frame 3 rearwardly in a free fall movement not sufficiently restrained by the extensible members 28 and 29. In order to substantially eliminate shock and resist such free fall movement, shock absorbing means 81 are mounted on the main frame 5 or on the connection means 16 thereon and are connected to the dumping frame 5.

In the illustrated embodiment, the shock absorbing means 81 includes a movable portion 82 and at least one and preferably a pair of flexible non-extensible members such as wire rope 83 and 84 each having one end thereof connected to the movable portion 82 and the other end thereof connected to the dumping frame forward end portion 30 preferably adjacent the side members 31 and 32 respectively thereof. As illustrated, the movable portion 82 is extended when the scull frame 3 is in the first position for carrying the receptacle 2 and is retracted by tension in the flexible members 83 and 84 which occurs when the dumping frame 4 is raised beyond a position in which the center of the receptacle rearwardly of a vertical line through the pins 22 and 23.

The shock absorbing means 81 is mounted on the connection means 16 in any suitable manner. As illustrated, a suitable bracket 85 is mounted on the connection means 16 and has the shock absorbing means connected thereto. An abutment member 86 is mounted on the connection means 16 and spaced from the bracket 85. The end of the shock absorbing means opposite the movable portion 82 is suitably connected to the abutment member 86 so that the movable portion 82 is retained in position when the flexible members 83 and 84 are in tension.

The shock absorbing means includes a cylinder portion and the movable portion 82 has a piston in the cylinder portion. The cylinder portion has a gas compartment and a liquid or oil compartment with movement of said piston effecting flow between portions of the respective compartments during discharging or dumping contents of the receptacle 2. Nitrogen over oil is preferred for the compartments in the cylinder portion of the shock absorbing means extensible member.

What we claim and desire to secure by Letters Patent is:

1. A receptacle transporting vehicle comprising:
    (a) an elongated mobile main frame having a forward end portion and a pair of side members extending rearwardly from said forward end portion and spaced transversely outwardly from a longitudinal central axis of said main frame, said side members of said main frame each having a rear end portion;
    (b) an elongated dumping frame having a forward end portion and a pair of side members extending rearwardly from said forward end portion and spaced transversely outwardly from a longitudinal central axis of said dumping frame, said side members of said dumping frame each having a rear end portion thereof pivotally mounted on the rear end portion of respective side members of said main frame;
    (c) an elongated scull frame having a forward end portion and a pair of side members extending rearwardly from said forward end portion and spaced transversely outwardly from a longitudinal central axis of said scull frame, said side members of said scull frame each having a rear end portion thereof pivotally mounted on the rear end portion of respective side members of said main frame;
    (d) extensible means extending between said forward end portion of said main frame and each of said side members of said dumping frame for urging said dumping frame about said pivotal mounting thereof for raising and lowering said dumping frame relative to said main frame;
    (e) extensible means mounted on said side members of said dumping frame and each having one end portion thereof pivotally connected to a respective one of said side members of said scull frame for effecting pivoted movement about the pivotal mounting of said scull frame between a first position for carrying a receptacle and a second position for discharging contents of the receptacle rearwardly of the vehicle, said pivotal movements of the scull frame and the dumping frame each supplementing the other in tilting the receptacle; and (f) means on said scull frame for engaging trunnion portions of the receptacle and for retaining the receptacle in supported engagement during discharging contents of the receptacle;

(g) said extensible means between the dumping frame and scull frame being double acting hydraulic cylinders and operable to swing the scull frame through an arc in the nature of 45° relative to the dumping frame;

(h) said extensible means between the forward end portion of said main frame and each of the side members of said dumping frame being two stage hydraulic cylinders with one stage being double acting and one stage being single acting, said two stages hydraulic cylinders being operable to swing the dumping frame through an arc in the nature of 75° relative to the main frame and the combined movement of the dumping frame and scull frame moves the scull frame through an arc in the nature of one hundred twenty degrees relative to the main frame; and (i) said two stage hydraulic cylinders having the double acting stage operable to retract the dumping frame to a position for the weight of the dumping frame, scull frame and empty receptacle further returns the dumping frame to the first position thereof.

2. A receptacle transporting vehicle as set forth in claim 1 wherein said means for retaining the receptacle in supported engagement during discharging contents of the receptacle includes:

(a) a hook portion for each of said side members of said scull frame and positioned intermediate the ends of said respective side members, said hook portions having rearwardly open sockets;

(b) a keeper member for each of said hook portions and pivotally mounted thereon, said keeper members each being movable between a first position closing the respective rearwardly open hook portion and a second position opening the respective rearwardly open hook portion;

(c) extensible means mounted on said members of said scull frame and each having one end thereof pivotally connected to a respective one of said keeper members for effecting pivotal movement of said keeper members between the first and second positions; and (d) said sockets having axial centers forwardly of axial centers of the pivotal mountings of the keeper members when each of the main, dumping and scull frames are in position for receiving a receptacle.

3. A receptacle transporting vehicle as set forth in claim 2 wherein a line extending between the axis of the pivotal mounting of said keeper members and the axial center of the respective receptacle trunnion receiving socket defines an acute angle in the range of 2° to 8° between same and a vertical line extending through the pivotal mounting of said keeper members.

4. A receptacle transporting vehicle as set forth in claim 1 including abutment means on and extending rearwardly of the forward end portion of said scull frame and substantially on the longitudinal center thereof for engaging the receptacle to limit swinging movement of the receptacle and retain the orientation thereof relative to said scull frame as the dumping frame and scull frame are swung between first and second positions.

5. A receptacle transporting vehicle as set forth in claim 1 including axles mounted on and extending outwardly of each side member of said main frame, wheels rotatably mounted on said axles and a support member mounted on each of said side members of said main frame and depending therefrom adjacent and under the respective axles and spaced from a support surface to limit drop of the receptacle on failure of a wheel.

6. A receptacle transporting vehicle as set forth in claim 1 wherein:

(a) said side members of said main frame each include an axle portion extending laterally outwardly therefrom and having at least one wheel mounted thereon;

(b) said side members of said main frame each include a bearing shaft supported on and extending laterally inwardly from said respective side member of said main frame adjacent to said respective axle portions;

(c) said side members of said dumping frame and said side members of said scull frame are each pivotally mounted on said bearing shaft on a respective one of said side members of said main frame;

(d) said side members of said scull frame are each coplanar with and above a respective one of said side members of said dumping frame and in supported engagement thereon when said scull frame is in the first position for carrying a receptacle; and (e) said side members of said dumping frame having portions overlying portions of said side members of the main frame and in supported engagement thereon when the dumping frame is in the first position for carrying a receptacle.

7. A receptacle transporting vehicle as set forth in claim 6 wherein said means for retaining the receptacle in supported engagement during discharging contents of the receptacle includes:

(a) a hook portion for each of said side members of said scull frame and positioned intermediate the ends of said respective side members, said hook portions each having rearwardly open sockets, said hook portions each being formed of laterally spaced plates;

(b) a keeper member for each of said hook portions and pivotally mounted thereon and positioned between the laterally spaced plates of said respective hook portion, said keeper members each being movable between a first position closing the respective rearwardly open hook portion and a second position opening the respective rearwardly open hook portion;

(c) extensible means mounted on said side members of said scull frame and each positioned between said laterally spaced plates of said respective hook portion and each having one end thereof pivotally connected to a respective one of said keeper members for effecting pivotal movement of said keeper, members between the first and second positions; and (d) said sockets having axial centers forwardly of axial centers of the pivotal mountings of the keeper members when each of the main, dumping and scull frames are in position to receive a receptacle.

8. A receptacle transporting vehicle as set forth in claim 7 wherein:
    (a) each keeper member includes a body portion and a first ear extending therefrom and having said respective extensible means one end pivotally connected to said first ear;
    (b) each of said hook portions includes a pin mounted on and extending between said laterally spaced plates thereof and extending through the body portion of the respective keeper member thereby defining the pivotal mounting of said keeper member on said hook portion;
    (c) a line extending through the center of each of said pins defining the pivotal mounting of said keeper members and the center of the respective socket for receiving a receptacle trunnion portion defines an acute angle in the range of 2° to 8° with a vertical line extending through the center of each of said pins defining the pivotal mounting of said keeper members; and
    (d) said first named lines each extend upwardly and forwardly from the center of each of said pins defining the pivotal mounting of said keeper members.

9. A receptacle transporting vehicle as set forth in claim 1 including:
    (a) a prime mover;
    (b) connection means on said main frame forward end portion for connecting said main frame to said prime mover and for permitting relative movement therebetween; and
    (c) shock absorbing means mounted on said connection means and connected to said dumping frame for retarding movement of a receptacle as the center thereof moves beyond a vertical line through a center of the pivotal mounting of said scull frame on said main frame to reduce shock.

10. A receptacle transporting vehicle as set forth in claim 9 wherein said shock absorbing means includes a movable portion and at least one flexible member having one end thereof connected to said movable portion and the other end thereof connected to said dumping frame end, said shock absorbing means movable portion being extended when said scull frame is in the first position for carrying a receptacle and being retracted by tension in said flexible member as the dumping frame moves to the second position thereof.

* * * * *